United States Patent [19]

Um et al.

[11] Patent Number: 5,085,497
[45] Date of Patent: Feb. 4, 1992

[54] METHOD FOR FABRICATING MIRROR ARRAY FOR OPTICAL PROJECTION SYSTEM

[75] Inventors: Gregory Um, Torrance; Andrei Szilagyi, Los Angeles, both of Calif.

[73] Assignee: Aura Systems, Inc., El Segundo, Calif.

[21] Appl. No.: 494,579

[22] Filed: Mar. 16, 1990

[51] Int. Cl.$^5$ .............................................. G02B 27/00
[52] U.S. Cl. .................... 359/848; 359/855; 359/900
[58] Field of Search .............. 350/320, 6.1, 6.6, 486, 350/487, 607, 608, 609, 616, 356; 310/320, 311, 318, 331, 333

[56] References Cited

U.S. PATENT DOCUMENTS

| | | | |
|---|---|---|---|
| 3,544,201 | 12/1970 | Flower et al. | 350/487 |
| 3,758,199 | 9/1973 | Thaxter | 350/487 |
| 4,525,644 | 6/1985 | Frohlich | 310/311 |
| 4,736,132 | 4/1988 | Culp | 350/487 |

Primary Examiner—Loha Ben
Attorney, Agent, or Firm—Poms, Smith, Lande & Rose

[57] ABSTRACT

A method for fabricating an array of mirrors for an optical projection system. This method comprises the steps of forming an array of holes between a top surface and a bottom surface on an electrically insulated substrate. These holes are then filled with an electrically conductive material. Another step in this method includes mounting a plurality of piezoelectric pedestals on the top surface of the substrate wherein each of the pedestals are disposed over a respective hole so that the first face of each of the pedestals is electrically connected to the conductive material in the respective holes. A plurality of mirrors are then mounted on the pedestals wherein each of the mirrors is disposed on at least one of the pedestals. After the mirrors are mounted the second face of each pedestal is electrically connected to a common circuit node.

75 Claims, 6 Drawing Sheets

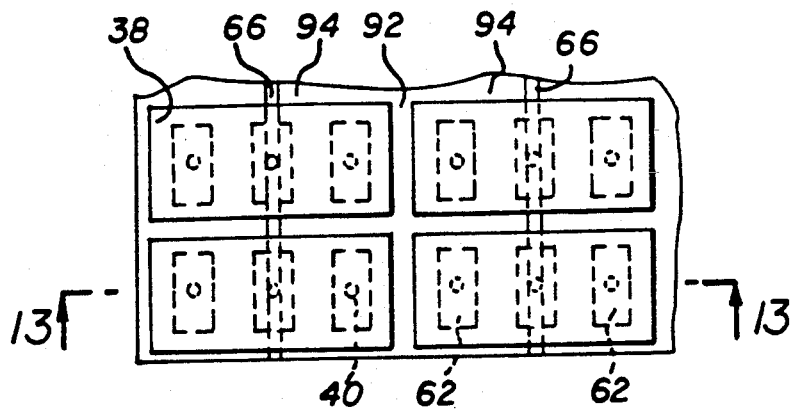
FIG. 12
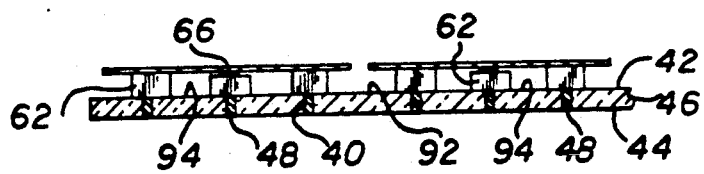
FIG. 13
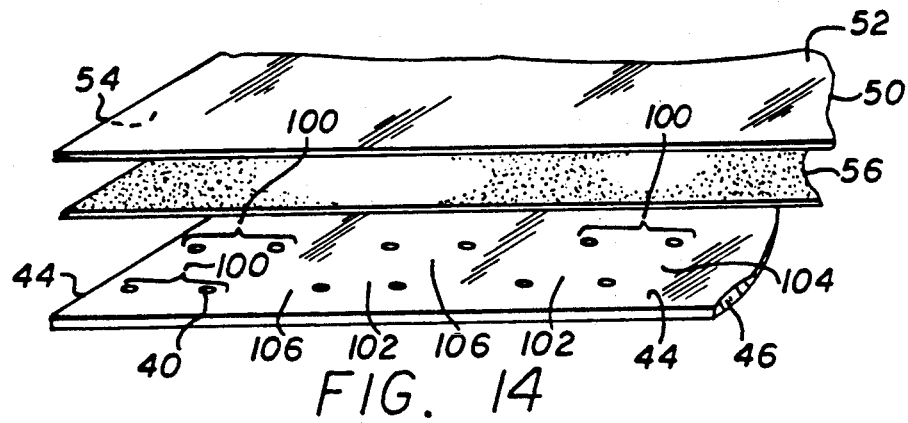
FIG. 14
FIG. 15
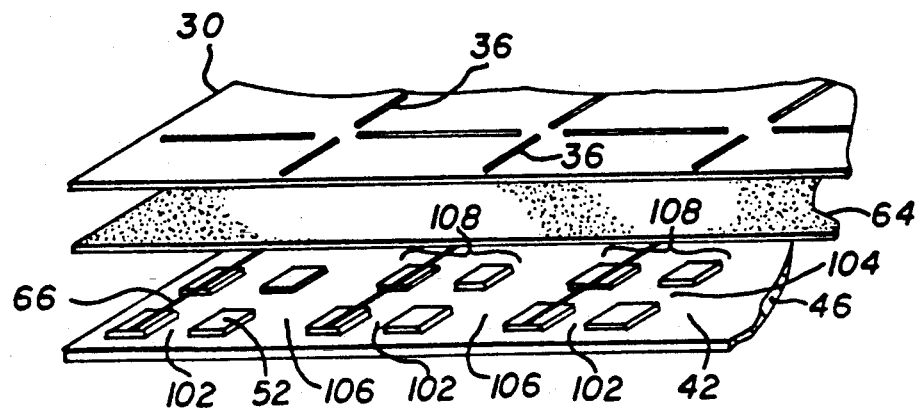

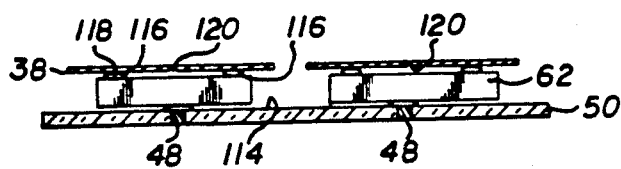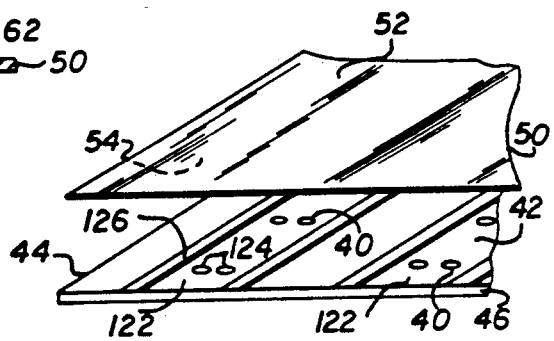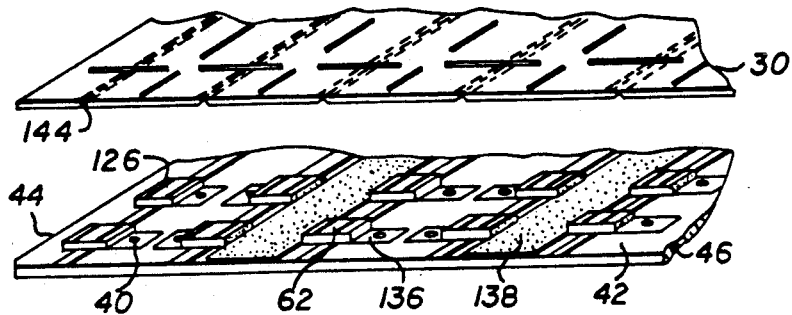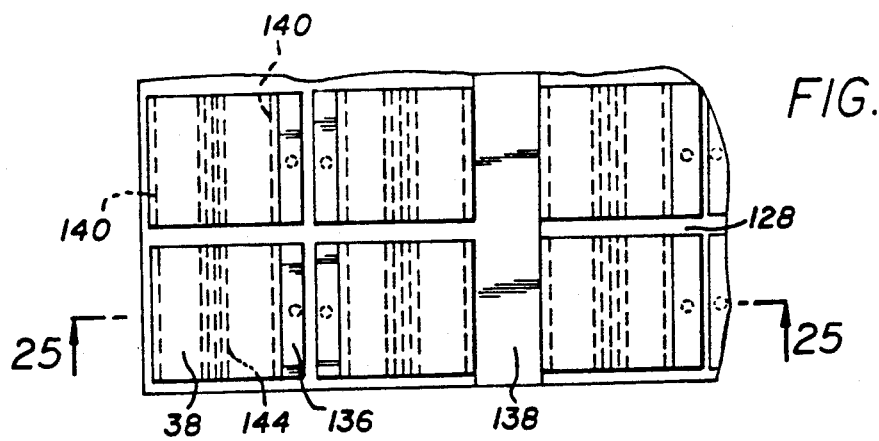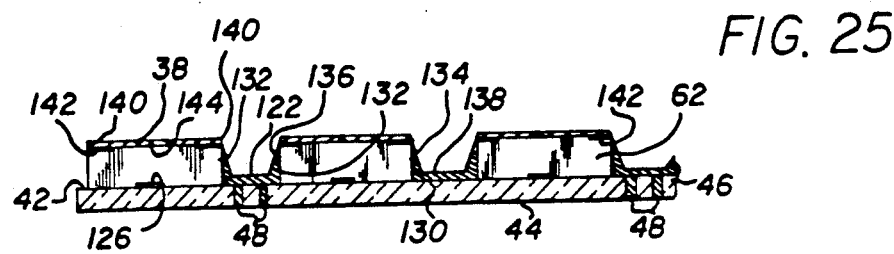

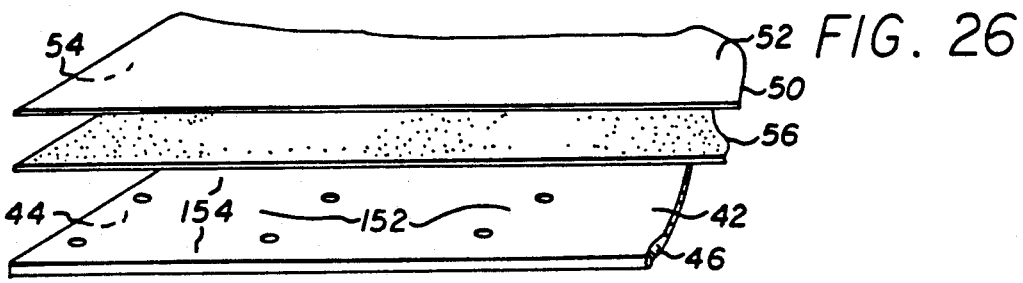
FIG. 26
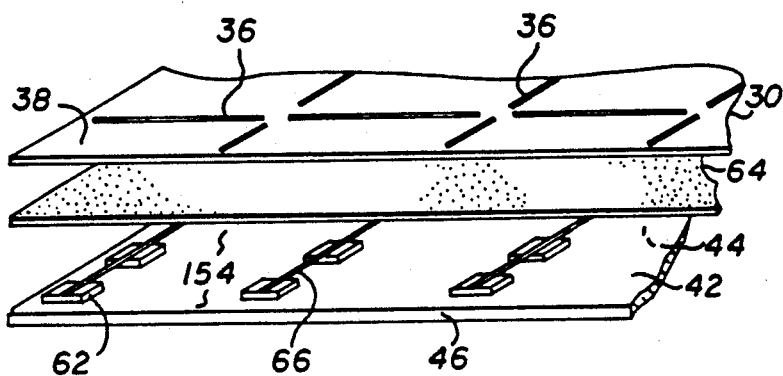
FIG. 27
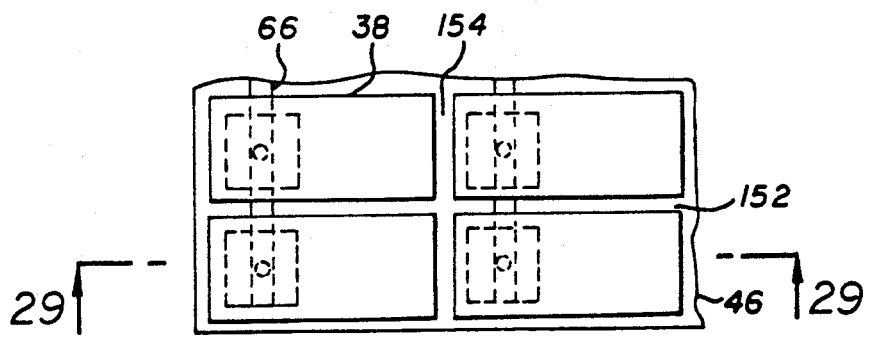
FIG. 28
FIG. 29
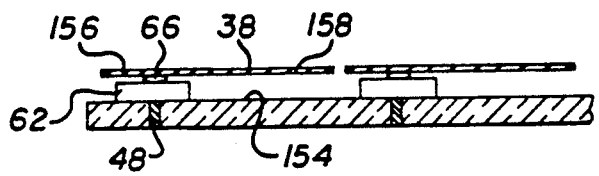

METHOD FOR FABRICATING MIRROR ARRAY FOR OPTICAL PROJECTION SYSTEM

RELATED APPLICATION DATA

The present disclosure is related to the disclosures of commonly owned co-pending U.S. applications Ser. No. 478,139 now U.S. Pat. No. 5,035,475, Ser No. 504,125 and Ser. No. 448,748, each of which is incorporated herein by reference.

FIELD OF INVENTION

The current invention relates generally to optical projection video systems and, more particularly to a novel method for fabricating a two dimensional mirror array for use in such systems.

BACKGROUND OF THE INVENTION

In one particular type of an optical projection video display system, a two dimensional mirror array is illuminated by a source of optical energy. Under electronic control, the orientation of each of the mirrors is perturbed to determine a propagation path for a beam of light reflecting from each mirror. Each of the reflected beams passes through a slit. The exact path of the reflected beam determines the intensity of optical energy which passes through the slit. The optical energy exiting from the slits is then focused upon a screen. Therefore, the orientation of the mirrors directing each respective one of the reflected beams through the slits determines the intensity for each pixel in the display. Alternatively, the mirror could be vibrated, causing the reflected beam to fan out. The degree of fan out would then be used to control the intensity of light passing through the slits.

Each of the mirrors is controlled by one or more piezoelectric pedestals upon which each mirror is mounted. By applying a DC electrical signal to each of the piezoelectric pedestals, the pedestal shape changes, is as well known in the art, thereby tilting the plane of the reflective surface of the mirror. The amplitude of the DC signal controls the degree of tilting of the mirror. To vibrate the mirror, and AC electrical signal is applied to the pedestal, or pedestals, upon which the mirror is mounted. The amplitude of the AC signal determines the degree of fan out of the reflected beam. Optical projection systems and various configurations of the mirror array have been described in the above referenced applications.

SUMMARY OF INVENTION

It is an object of the present invention to provide a novel method by which various configurations of two dimensional mirror arrays may be fabricated. It is another object of the present invention to fabricate such mirror arrays using conventional micro-circuit fabrication techniques.

According to the present invention, a method for fabricating an array of mirrors for an optical projection system includes forming an array of holes between a top surface and a bottom surface of an electrically insulative substrate, filling the holes with an electrically conductive material, mounting a plurality of piezoelectric pedestals on the top surface of the substrate with a first face thereof in electrical conduction with the electrically conductive material in a respective one of the holes, mounting the plurality of mirrors on the pedestals and electrically connecting a second face of each of the pedestals to a common circuit node. The mirrors may be disposed on one or more of the pedestals.

In one aspect of the present invention, the piezoelectric pedestals are formed by first mounting a piezoelectric layer on the substrate and cutting orthogonol grooves there through to form each of the pedestals. Similarly, the mirrors may be formed by laying an optically reflective foil on the pedestals and cutting the foil between rows and columns of the pedestals to form each of the mirrors.

These and other objects, advantages and features of the present invention will become readily apparent to those skilled in the art from a study of the following description of an exemplary preferred embodiment when read in conjunction with the attached drawings and appended claims.

BRIEF DESCRIPTION OF THE DRAWING

FIG. 12 is a phantom, broken away plan view of a fully assembled two dimensional mirror array constructed in accordance with the first and second sequence of fabrication steps for the third embodiment of the present invention;

FIG. 13 is a view taken along line 13—13 of FIG. 12;

FIG. 14 is an exploded view, with elements broken away, showing a first sequence of fabrication steps for a fourth embodiment of the present invention;

FIG. 15 is an exploded view, with elements broken away, showing completion of the first sequence of fabrication steps and a second sequence of fabrication steps for the second embodiment of the present invention;

FIG. 21 is a view taken along line 21—21 of FIG. 20;

FIG. 22 is an exploded view, with elements broken away, showing a first sequence of fabrication steps for a sixth embodiment of the present invention;

FIG. 23 is an exploded view, with elements broken away, showing completion of the first sequence of fabrication steps and a second sequence of fabrication steps for the sixth embodiment of the present invention;

FIG. 24 is a phantom, broken away plan view of a fully assembled two dimensional mirror array constructed in accordance with the first and second sequence of fabrication steps for the sixth embodiment of the present invention;

FIG. 25 is a view taken along line 25—25 of FIG. 24;

FIG. 26 is an exploded view, with elements broken away, showing a first sequence of fabrication steps for a seventh embodiment of the present invention;

FIG. 27 is an exploded view, with elements broken away, showing completion of the first sequence of fabrication steps and a second sequence of fabrication steps for the seventh embodiment of the present invention;

FIG. 28 is a phantom, broken away plan view of a fully assembled two dimensional mirror array constructed in accordance with the first and second sequence of fabrication steps for the seventh embodiment of the present invention;

FIG. 29 is a view taken along line 29—29 of FIG. 28.

DESCRIPTION OF AN EXEMPLARY PREFERRED EMBODIMENT

Figure 1:
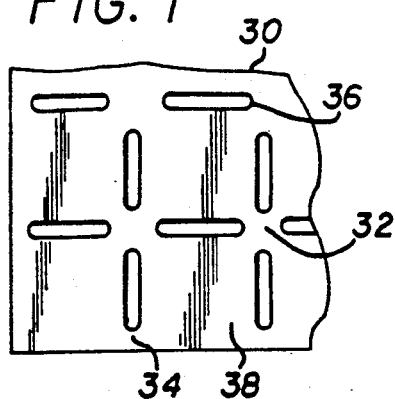
FIG. 1 is an elevational view, broken away, of an optically reflective foil showing precut perforations for use in the various embodiments of the two dimensional mirror array constructed according to the principles of the present invention.
Figure 2:
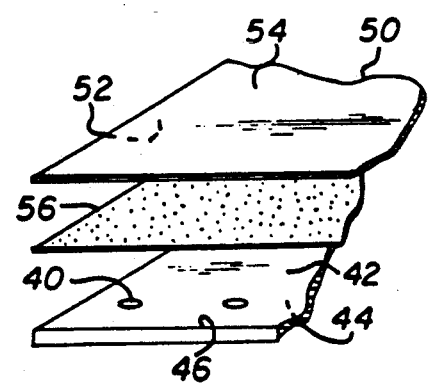
FIG. 2 is an exploded view, with elements broken away, showing a first sequence of fabrication steps for a first embodiment of the present invention.

Referring now to FIG. 1, there is shown a broken away portion of an optically reflective foil 30 having rows 32 and columns 34 of precut perforations 36. The optical reflective foil 30 is cut, as will be described in greater detail hereinbelow, along the rows 32 and columns 34 of perforations 36 to form a plurality of individual mirrors 38 for use in each of the two dimensional mirror arrays constructed in accordance with the hereinbelow described embodiments of the fabrication method of the present invention. The cutting may be performed by any known microelectronic cutting technique, such as laser cutting or sawing. Other properties of the foil 30, such as its relative rigidity or flexibility or its electrical properties, are described below in conjunction with its use in particular embodiment of the two dimensional mirror array.

With particular reference to FIGS. 2-5, a fabrication method for a first embodiment of a two dimensional mirror array is described. An array of holes 40 is formed between a top surface 42 and a bottom surface 44 of an electrically insulative substrate 46. The holes 40 in the presently described embodiment of the present invention are formed in equally spaced rows and in equally spaced columns. In the presently described embodiment of the present invention, and in each of the subsequently described embodiments, the holes 40 may be formed preferably by micro drilling. Alternative methods of forming the holes 40 include masking either or both of the top surface 42 and bottom surface 44 of the substrate 46 by photolithographic techniques and chemically etching the holes 40.

Figure 5:
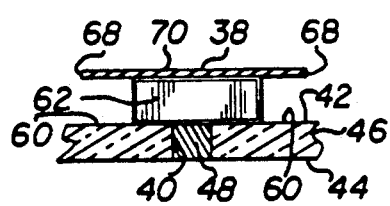
FIG. 5 is a view taken along line 5—5 of FIG. 4.
Figure 6:
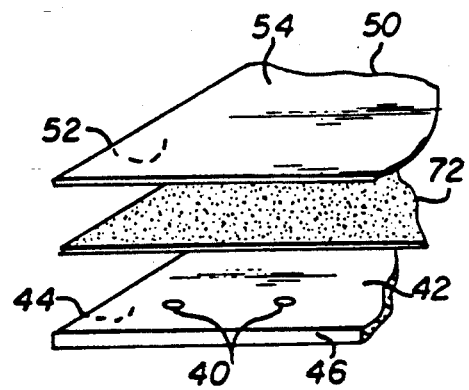
FIG. 6 is an exploded view, with elements broken away, showing a first sequence of fabrication steps for a second embodiment for the present invention.

The next step in practicing the present invention is filling holes 40 with an electrically conductive material 48 as best seen in FIG. 5. To fill the holes 40 with the material 48 in a preferred embodiment, any suitable metal may be placed on either or both of the top surface 42 and the bottom surface 44 after the holes 40 are formed. The metal may be placed thereon by any suitable technique, such as vapor deposition. The metal is then melted causing the metal to flow into the holes 40. By conventional photolithographic etching techniques, the metal may be removed from the substrate 46 leaving the metal 48 within the holes 40. The etching of the metal from the top surface 42 and bottom surface 44 causes the material 48 to extend slightly outwardly from the plane of the top surface 42 and bottom surface 44 of the substrate 46 to facilitate making hereinbelow described electrical contacts.

A piezoelectric layer 50 is subsequently mounted on the substrate 46 in accordance with practicing the method of the present invention. The piezoelectric layer 50 is generally coextensive with the top surface 42 of the substrate 46. In one particular embodiment of the present invention, a first face 52 and a second face 54 of the piezoelectric layer 50 may be metallized by a known techniques prior to mounting to the substrate 46. To mount the piezoelectric layer 50 to the substrate 46, an electrically conductive epoxy 56 is applied between the top surface 42 of the substrate 46 and the first face 52 of the piezoelectric layer 50. The metal 48 in each of the holes 40 electrically contacts the first face 52 of the piezoelectric layer 50 after the above described mounting is performed.

A plurality of first parallel grooves are cut completely through the piezoelectric layer 50. Each of the first parallel grooves are cut in a respective one of first interstices 58 between rows of the holes 40. The cutting of the first grooves completely removes piezoelectric material therefrom as well as any of the epoxy 56 and metal, if provided, on either of the first face 52 or second face 54 of the piezoelectric layer 50.

Figure 3:
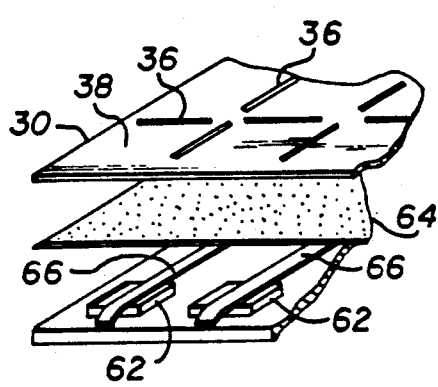
FIG. 3 is an exploded view, with elements broken away, showing completion of the first sequence of fabrication steps of FIG. 2 and a second sequence of fabrication steps for the first embodiment of the present invention.
Figure 4:
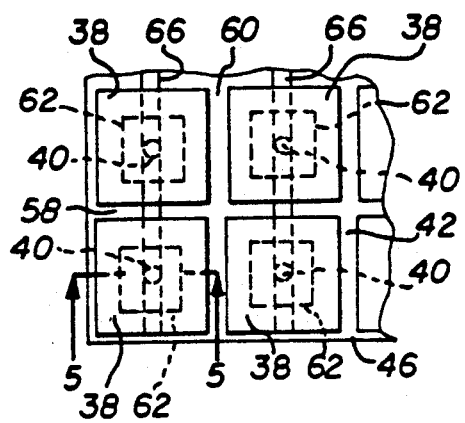
FIG. 4 is a phantom, broken away plan view of a fully assembled two dimensional mirror array constructed in accordance with the first and second sequence of fabrication steps for the first embodiment of the present invention.

A plurality of second parallel grooves, orthogonal to the first grooves, are also completely cut through the piezoelectric layer 50. Each of the second grooves is cut in a respective one of second interstices 60 between columns of the holes 40. Similarly, the second grooves remove any of the epoxy 56 or any metal from the first face 52 or second face 54 of the piezoelectric layer 50. The cutting of the first grooves and the second grooves pattern the piezoelectric layer 50 into a plurality of pedestals 62, as best seen in FIG. 3. Each of the pedestals 62 includes the first face 52 of the piezoelectric layer 50 which is electrically connected to the metal 48 in a respective one in the holes 40, with the second face 54 being opposite thereto.

The foil 30, in a relatively flexible form, is mounted on the piezoelectric layer 50 subsequent to cutting of the first and second grooves. The rows 32 and columns 34 of the perforations 36 are generally disposed along the center line of a respective one of the first grooves in the first interstices 58 and the second grooves in the second interstices 60, respectively. The foil 30 is then cut along the perforations 36 to form a plurality of mirrors 38 wherein each of the mirrors 38 is mounted to a respective one of the pedestals 62. To mount of the foil 30 to the piezoelectric layer 50, a layer of an electrically conductive epoxy 64 may be applied to the second face 54 of each of the pedestals 62.

Completing the steps in practicing the presently described embodiment of the present invention, the second face 54 of each of the piezoelectric pedestals 62 is electrically connected to a common circuit node (not shown) as described in the above referenced applications. In one embodiment of the present invention, this connection is made prior to mounting of the foil 30 by placing a plurality of electrically conductive strips 66 across the second face 54 of the pedestals 62 wherein each of the strips 66 is disposed in a respective one of columns of pedestals 62. The conductive epoxy 64 used to mount the foil 30 will also mount the conductive strip 66 to the pedestal 62. Each of the conductive strips 66 is then connected to the common circuit node. Alternatively, the conductive strips 66 may be positioned as hereinabove described subsequent to mounting and cutting of the foil 30. If so, the strips 66 are bonded to the surface of the mirrors 38 by conductive epoxy. The foil 30 would also be electrically conductive.

In one particular embodiment of the present invention, the first grooves over the first interstices 58 are relatively narrow and the second grooves over the second interstices 60 are relatively wide. Opposite ends 68 of each of the mirrors 38 then overlie one of the second grooves and a middle portion 70 of the mirror is mounted to the pedestal 62. In this particular two dimensional mirror array, an AC electrical signal is applied to each pedestal 62 through the metal 48 in each hole 40 with the connection thereto being at the bottom surface 44 of the substrate 46. The ground connection is made through the strips 66 connected to the common circuit node. The AC signal causes deformation of the pedestal 62 normal to the top surface 42 of the substrate 46. The relatively flexible mirror 38 is then vibrated by the AC signal excited deformation to cause fan out of the reflected beam. The frequency of the vibration and its amplitude is determined by the frequency and amplitude of the AC signal.

Figure 7:
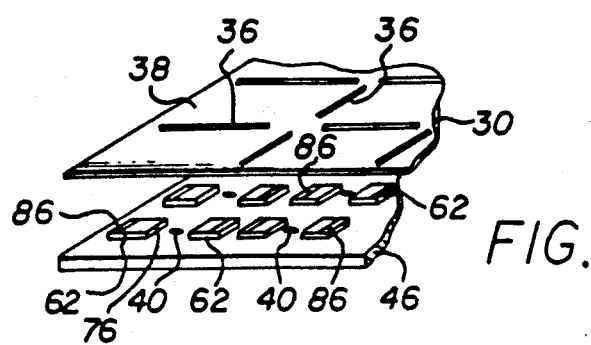
FIG. 7 is an exploded view, with elements broken away, showing completion of the first sequence of fabrication steps and a second sequence of fabrication steps for the second embodiment of the present invention.
Figure 8:
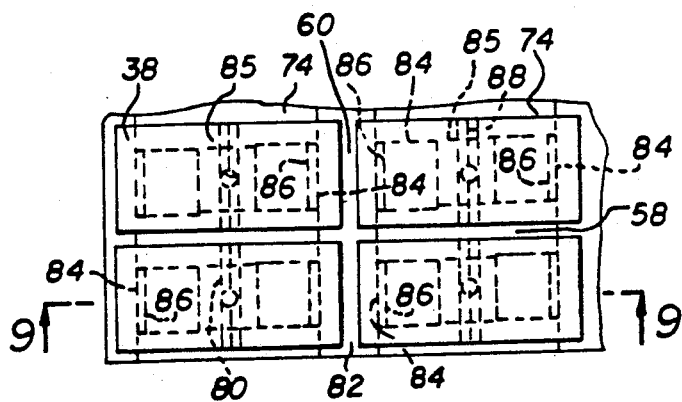
FIG. 8 is a phantom, broken away plan view of a fully assembled two dimensional mirror array constructed in accordance with the first and second sequence of fabrication steps for the second embodiment of the present invention.
Figure 9:
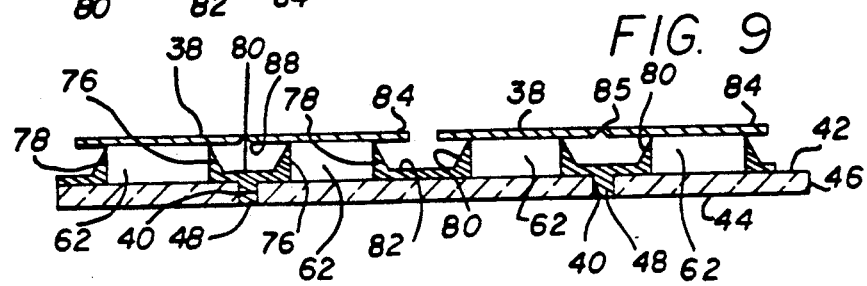
FIG. 9 is a view taken along line 9—9 of FIG. 8.
Figure 10:
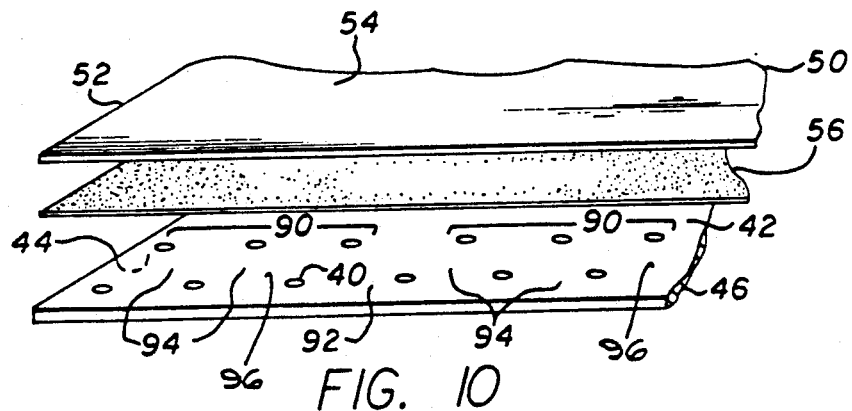
FIG. 10 is an exploded view, with elements broken away, showing a first sequence of fabrication steps for a third embodiment of the present invention.

With particular reference to FIGS. 6-9, a fabrication method for a second embodiment of the two dimensional mirror array is described. Similarly to the above-described first embodiment, an array of holes 40 is formed between the top surface 42 and the bottom surface 44 of the electrically insulated substrate 46, with the holes 40 being disposed in equally spaced rows and in equally spaced columns. Each of the holes 40 is filled with the electrically conductive material 48 as best seen in FIG. 9. The forming of the holes 40 and the filling thereof with the electrically conductive material 48 is practiced as hereinabove described.

In contrast to the above-described first embodiment of the present invention, the mounting of the piezoelectric layer 50 to the substrate 46 is through a layer of glue 72. The glue 72 does not have any electrical properties. Similarly to the embodiment described above, the piezoelectric layer 50 is coextensive with the top surface 42 of the substrate 46.

A plurality of first parallel grooves are cut completely through the piezoelectric layer 50. Each of the first parallel grooves are cut in a respective one of the first interstices 58 between rows of the holes 40. The cutting of the first groove completely removes piezoelectric material therefrom, as well as any of the glue 72 used to mount the piezoelectric layer 50 to the substrate 46.

A plurality of second parallel grooves, orthogonal to the first grooves, are also completely cut through the piezoelectric layer 50. Each of the second grooves is cut over a respective one of columns 74 of the holes 40. Similarly, the second grooves remove any of the glue 72 from within the cut of the second groove.

A plurality of third grooves, orthogonal to the first grooves, are also completely cut through the piezoelectric layer 50. Each of the third grooves are alternatingly disposed substantially midway between the second grooves wherein each of the third grooves are the respective one of the second interstices 60 between the columns 74 of the holes 40. The cutting of the first, second and third grooves pattern the piezoelectric layer 50 into a plurality of pedestals 62 as best seen in FIG. 7. Each of the pedestals 62 includes a first face 76 adjacent a respective one of holes 40 and a second face 78 on the opposite side of the pedestal 62.

As best seen in FIGS. 8-9, the first face 76 of each of the pedestals 62 is electrically connected to the metal 48 in the adjacent one of the holes 40. The second face 78 of each of the pedestals 62 is connected to a common circuit node (not shown) as described in the above referenced applications. To electrically connect the first face 76 of each of the pedestals 62 to the metal 48 in the adjacent of one of the holes 40, the second grooves above the columns 74 of holes 40 are metallized with a metal 80 which coats the first face 76 of each of the pedestals 62 and the top surface 42 of the substrate 46 exposed by the second grooves. The metal 80 is then patterned to connect only the first face 76 of each of the pedestals 62 to the metal 48 in the adjacent one of the holes 40, as best seen in FIG. 8. Similarly, to connect the second face 78 to the common circuit node, the third grooves in the second interstices 60 are metallized with the metal 82 which coats the second face 78 from each of the pedestals 62 and the top surface 42 of the substrate 46 exposed by the third grooves. The metal 82 is then electrically connected to the common circuit node. The metallization and patterning is performed through conventional micro-circuit fabrication techniques such as vapor deposition and photo-lithographic masking and etching.

The foil 30, in a relatively rigid form, is mounted to the piezoelectric layer 50 subsequent to cutting of the first, second and third grooves and metallizing as above described. The rows 32 and columns 34 of the perforations 36 are generally disposed along the center line of the respective one of the first grooves in the first interstices 58 and the third grooves in the second interstices 60, respectively. The foil 30 is then cut along the perforations 36 to form the plurality of mirrors 38. Each of the mirrors 38 is disposed on a respective one of spaced apart pairs of the pedestals 62. Opposing end portions 84 of each of the mirrors 38 are mounted to the second face 54 of each of the pedestals 62 in each of the spaced apart pairs at their edges along the third grooves above the second interstices 60. More particularly, strips of glue 86 are applied along edges adjacent to third grooves of each of the pedestals 62 prior to placing the foil 30 on the pedestals 62. A middle portion 85 of the mirror 38 is disposed over one of the second grooves cut over the columns 74 of holes 40.

In one particular embodiment of the present invention, the first and third grooves over the first interstices 58 and the second interstices 60, respectively, are relatively narrow and the second grooves over the column 74 of holes 40 are relatively wide. In this particular two dimensional mirror array, an AC electrical signal is applied to each pedestal 62 through the metal 48 in each hole 40 adjacent its first face 76 through the metal 80. The AC signal is applied to the metal 48 at the bottom surface 44 of the substrate 46. The ground connection is made through the metal 82 the second face 78 of all of the pedestals 62 to the common circuit node. The AC signal causes the pedestal 62 to operate in a horizontal shear mode, parallel to the plane of the substrate 46. Increasing amplitudes of the electrical signal caused the second face 54 of the pedestal 62 to move towards each other in a plane parallel to that of the substrate 46. Accordingly, the mirror 38, being mounted only at its edges 84, will assume an increasingly triangular shape with increasing voltage. To facilitate the bending of the relatively rigid foil 30, the foil 30 may have its underside precut with channels 88 alternatingly disposed between the columns 34 of perforations 36. As best seen in FIGS. 8-9, the channels 88 are disposed over the respective one of the columns 74 of holes 40. The AC voltage need only have a positive (or negative) amplitude and may therefore be a saw tooth type waveform to cause the mirror 38 to vibrate. The vibration of the mirror 38 then causes fan out of the reflected beam.

With particular reference to FIGS. 10-13, a fabrication method for a third embodiment of a two-dimensional mirror array is described. The array of holes 40 is formed between the top surface 42 and the bottom surface 44 of an electrically insulated substrate 46. The holes 40 in the third embodiment of the present invention are formed in equally spaced rows. The holes 40 in each of the rows are grouped in triplets 90. The triplets 90 are aligned in columns. The holes 40 in each of the triplets 90 are separated by a first distance. The holes adjacent each other but in separate triplets 90 are separated by a second distance. As described hereinabove, each of the holes 40 is filled with an electrically conductive material 48.

The piezoelectric layer 50 is subsequently mounted on the substrate 46. The piezoelectric layer 50 is generally coextensive with the top surface 42 of the substrate 46. In the third embodiment of the present invention, the first face 52 and the second face 54 of the piezoelectric layer 50 may be metallized as described hereinabove with reference to the first embodiment. To mount the piezoelectric layer 50 to the substrate 46, the electrically conductive epoxy 56 is applied between the top surface 42 of the substrate 46 and the first face 52 of the piezoelectric layer 50. The metal 48 in each of the holes 40 electrically contacts the first face 52 of the piezoelectric layer 50 after the above-described mounting is performed.

A plurality of first parallel grooves are cut completely through the piezoelectric layer 50. Each of the first parallel grooves are cut in a respective one of first interstices 92 between columns of the triplets 90 of the holes 40. The cutting of the first groove completely removes piezoelectric material therefrom as well as any of the conductive epoxy 56 and metal, if provided, on either of the first face 52 or second face 54 of the piezoelectric layer 50.

A plurality of second parallel grooves, parallel to the first grooves, are also completely cut through the piezoelectric layer 50. Each of the second grooves is cut in a respective one of second interstices 94 between columns of holes 40 wherein each of the second interstices 94 are within the triplets 90 of the holes 40. Similarly, the second grooves remove any of the epoxy 56 or any metal from the first face 52 or second face 54 of the piezoelectric layer 50.

Figure 11:
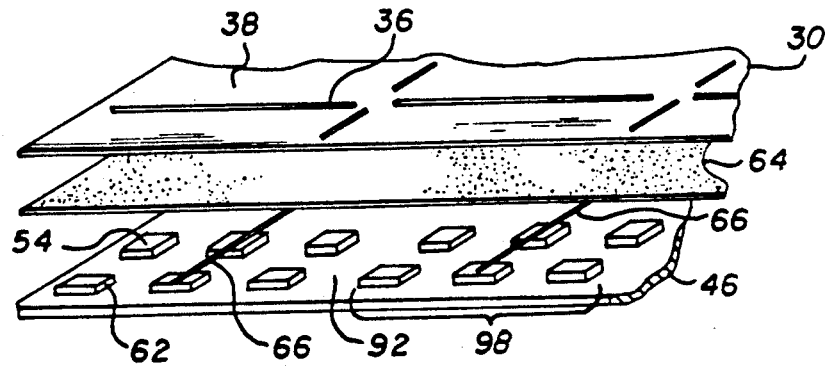
FIG. 11 is an exploded view, with elements broken away, showing completion of the first sequence of fabrication steps and a second sequence of fabrication steps for the third embodiment of the present invention.
Figure 16:
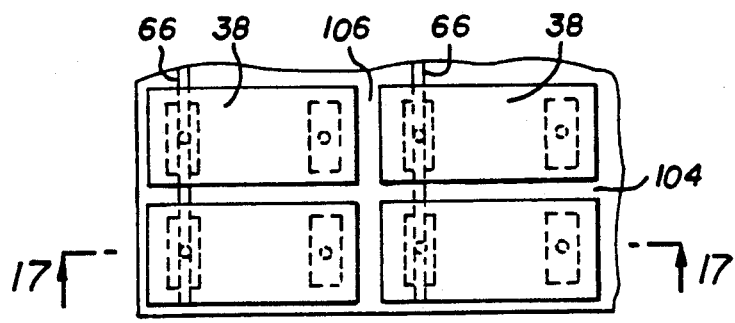
FIG. 16 is a phantom, broken away plan view of a fully assembled two dimensional mirror array constructed in accordance with the first and second sequence of fabrication steps for the fourth embodiment of the present invention.
Figure 17:
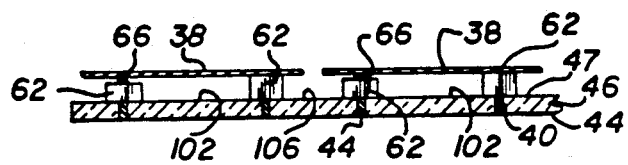
FIG. 17 is a view taken along line 17—17 of FIG. 16.

A plurality of third parallel grooves, orthogonal to the first grooves, are also completely cut through the piezoelectric layer 50. Each of the third grooves are cut in a respective one of third interstices 96 between rows of the holes 40. Similarly, the third grooves remove any of the epoxy 56 or any metal from the first face 52 or second face 54 of the piezoelectric layer 50. The cutting of the first, second, and third grooves pattern the piezoelectric layer 50 into a plurality of pedestals 62 as best seen in FIG. 11. Each of the pedestals 62 includes the first face 52 of the piezoelectric layer 50, which is electrically connected to the metal 48 in a respective one of the holes 40 with the second face 54 being opposite thereto.

The foil 30, in a relatively rigid form, is mounted on the piezoelectric layer 50 subsequent to cutting of the first, second, and third grooves. Each of the rows 32 of the precut perforation 36 are positioned over a respective one of the third grooves, cut above the third interstices 96. Each of the columns 34 of the perforations 36 are disposed over a respective one of the first grooves cut over the first interstices 92. The foil 30 is then cut along the perforations 36 to form a plurality of mirrors 38 wherein each of the mirrors is disposed on a respective triplet 98 of the pedestal 62. Each triplet 98 of the pedestal 62 is associated with a respective one of the triplets 90 of the holes 40. To mount the foil 30 to the piezoelectric layer 50, a layer of the electrically conductive epoxy 64 may be applied to the second face 54 of each of the pedestals 62.

Completing the steps and practicing the third embodiment of the present invention, the second face of each of the piezoelectric pedestals 62 is electrically connected to a common circuit node (not shown) as described in the above-referenced applications. In one embodiment of the present invention, this connection is made prior to mounting of the foil 30 by placing a plurality of the hereinabove described electrically conductive strips 66 across the second face 54 of selected ones of the pedestals 62. The selected ones of the pedestal 62 are disposed in selected columns of the pedestal 62 with one of the pedestal 62 from each of the triplets 98 being in the selected columns. The conductive epoxy 64 used to the mount the foil 30 will also mount the conductive strips 66 to the selected ones of the pedestal 62. The foil 30 is further electrically conductive to connect electrically the second face of the pedestal 62 in each of the triplets 98 to each other. Each of the conductive strips 66 is then connected to the common circuit node as described in the above-referenced applications. Alternatively, the conductive strips 66 may be positioned as hereinabove described subsequent to mounting and cutting of the foil 30. If so, the strips 66 are bonded to the surface of the mirrors 38 by conductive epoxy. The foil 30 would also be electrically conductive, as described immediately above.

In one particular embodiment of the present invention as described in FIGS. 10–13, the first and third grooves are relatively narrow and the second grooves are relatively wide. An AC electrical signal may be applied to the outer pedestal 62 of each of the triplets 98 through the metal 48 in each hole 40 with the connection thereto being at the bottom surface of the substrate 46. At the metal 48 connected to the middle pedestal 62 in each of the triplets 98, the AC signal is inverted or 180° out of phase. The ground connection is made through the conductive strip 66 connected to the common circuit node. The signals applied to the pedestals 62 cause deformations normal to the top surface 42 of the substrate 46. The AC signal will therefore cause the mirror 38 mounted to the triplet 98 of pedestal 62 to triangulate at a frequency commensurate with the frequency of the AC signal. The amplitude of the AC signal will determine the amplitude of the triangulation. This triangulation is similar to a vibration to cause fan out of the reflected beam.

With particular reference to FIGS. 14–17, a fabrication method for a fourth embodiment of a two dimensional mirror array is described. The array of holes 40 is formed between the top surface 42 and the bottom surface 44 of the electrically insulative substrate 46. The holes 40 in the fourth embodiment of the present invention are formed in equally spaced rows. The holes 40 in each of the rows are formed in spaced apart pairs 100. The spaced apart pairs of holes are aligned in equally spaced columns. As described hereinabove, each of the holes 40 is filled with an electrically conductive material 48.

The piezoelectric layer 50 is subsequently mounted on the substrate 46. The piezoelectric layer 50 is generally coextensive with the top surface 42 of the substrate 46. In the fourth embodiment of the present invention, the first face 52 and the second face 54 of the piezoelectric layer 5 may also be metallized. To mount the piezoelectric layer 50 to the substrate 46, the electrically conductive epoxy 56 is applied between the top surface 42 of the substrate 46 and the first face 52 of the piezoelectric layer 50. The metal 48 in each of the holes 40 electrically contacts the first face 52 of the piezoelectric layer 50 after the above-described mounting is performed.

A plurality of first parallel grooves are cut completely through the piezoelectric layer 50. Each of the first parallel grooves are cut in a respective one of first interstices 102 between columns of the holes 40 wherein the first interstices 102 are within the spaced apart pairs 100 of the holes 40. The cutting of the first grooves completely removes piezoelectric material therefrom as well as any of the epoxy 56 and metal, if provided, on either the first face 52 or second face 54 of the piezoelectric layer 54.

A plurality of second parallel grooves, orthogonal to the first grooves, are also completely cut through the piezoelectric layer 50. Each of the second grooves is cut in a respective one of second interstices 104 between rows of the holes 40. Similarly, the second grooves remove any of the epoxy 56 or any metal from the first face 52 or second face 54 of the piezoelectric layer 50.

A plurality of third parallel grooves, parallel to the first grooves, are also completely cut through the piezoelectric layer 50. The third grooves are cut in a respective one of third interstices 106 between columns of the holes 40 wherein the third interstices 106 are intermediate the pairs 100 of holes 40. The cutting of the first, second, and third grooves pattern the piezoelectric layer into a plurality of spaced apart pairs 108 of the piezoelectric pedestal 62. Each of the spaced apart pairs 108 of the pedestal 62 is associated with a respective one of the spaced apart pairs 100 of the holes 40. Each of the pedestals 62 is disposed over a respective one of the holes 40 and has the first face 52 in electrical contact with the material 48 and a respective one of the holes 40 and the second face 54 opposite thereto.

The foil 30, in a relatively rigid form, is mounted on the piezoelectric layer 50 subsequent to cutting of the first, second, and third grooves. The rows of perforations 36 are positioned over a respective one of the second grooves cut over the second interstices 104. The columns 34 of the perforations 36 are positioned over a respective one of the third grooves cut over the third interstices 106. The foil 30 is then cut along the perforations 36 to form a plurality of mirrors 38 wherein each of the mirrors 38 is mounted to a respective one of the spaced apart pairs of pedestals 108. To mount the foil 30 to the piezoelectric layer 50, a layer of the electrically conductive epoxy 64 may be applied to the second phase 54 of each of the pedestals 62.

Completing the steps and practicing the fourth embodiment of the present embodiment, the second face 54 of each of the piezoelectric pedestals 62 is electrically connected to a common circuit node (not shown) as described in the above-referenced applications. In the presently-described embodiment of the present invention, this connection is made prior to mounting of the foil 30 by placing a plurality of the electrically conductive strips 66 across the second face 54 of selected ones of the piezoelectric pedestals 62. The selected ones of the piezoelectric pedestal 62 are disposed in selected columns of the pedestals with one of the pedestals 62 from each of the spaced apart pairs 108 being in the selected columns. The conductive epoxy 64 used to mount the foil 30 will also mount the conductive strip 66 to the selected ones of the pedestals. The foil 30 is further electrically conductive to connect electrically the second face 54 of the other pedestal 62 in each of the spaced apart pairs 108 to each other. Alternatively, the conductive strip 66 may be positioned as hereinabove described subsequent to mounting and cutting of the foil 30. If so, the strips 60 are bonded to the surface of the mirrors 38 by conductive epoxy. The foil 30 would also be electrically conductive in this alternative.

In one particular embodiment of the presently described invention, the first grooves over the first interstices 102 are relatively wide and the second and third grooves over the second interstices 104 and third interstices 106 are relatively narrow. In this particular two dimensional mirror array, a DC electrical signal is applied to each pedestal 62 through the metal 48 in each hole 40 with the connection thereto being at the bottom surface 44 of the substrate 46. The ground connection is made through the conductive strip 66 connected to the common circuit node. The DC signal applied to one pedestal 62 in each of the spaced apart pairs 108 is of opposite polarity to the signal applied to the other pedestal 62 in the same pair 108. The DC signal causes the piezoelectric pedestal to deform normal to the plane of the substrate 46 thereby causing the mirror 38 to be tilted. The degree of the tilt is commensurate with the amplitude of the DC signal. The spaced apart pairs 108 of pedestals may also be excited by applying an AC signal 180° out of phase at each pedestal 62 in each pair 108. Again, the deformation of each pedestal 62, normal to the surface of the substrate 46, will cause the mirror 38 to vibrate in a tilting fashion commensurate with the frequency of the AC signal. Again, the amplitude of the AC signal will determine the amplitude of this vibration. Thus, in the fourth embodiment of the present invention, the mirror array may be used either to steer the reflected beam or to cause the reflected beam to fan out.

With particular reference to FIGS. 18-21, a fabrication for a fifth embodiment of a two dimensional mirror array is described. The array of holes 40 is formed between the top surface 42 and the bottom surface 44 of the electrically insulative substrate 46. The holes 40 in the fifth embodiment of the present invention are formed in equally spaced columns and in equally spaced rows. As described hereinabove, each of the holes 40 is filled with an electrically conductive material 48 as best seen in FIG. 21. The forming of the holes 40 and the filling thereof with the electrically conductive material is practice as hereinabove described.

Figure 18:
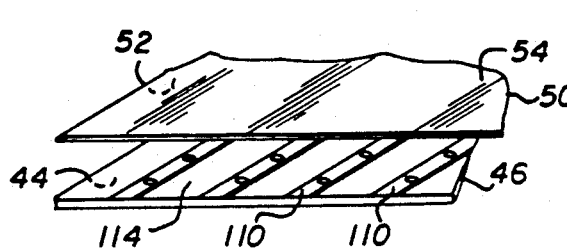
FIG. 18 is an exploded view, with elements broken away, showing a first sequence of fabrication steps for a fifth embodiment of the present invention.

The piezoelectric layer 50 is subsequently mounted on the substrate 46. The piezoelectric layer 50 is generally coextensive with the top surface 42 of the substrate 46. In the fifth embodiment of the present invention, the first face 52 and the second face 54 of the piezoelectric layer 50 may be metallized as described hereinabove with reference to the first embodiment. To mount the piezoelectric layer 50 to the substrate 46, a plurality of strips 110 of an electrically conductive epoxy are applied between the top surface 42 of the substrate 46 and the piezoelectric layer 50. Each of the strips 110 are disposed of over a respective one of the columns of the holes 40, as best seen in FIG. 18.

A plurality of first parallel grooves are cut completely through the piezoelectric layer 50. Each of the first grooves are cut in a respective one of first interstices 112 between rows of the holes 40. The cutting of the first grooves completely removes piezoelectric material therefrom, as well as any of the strips 110 of conductive epoxy and metal if any of either face of the piezoelectric layer 50.

Figure 19:
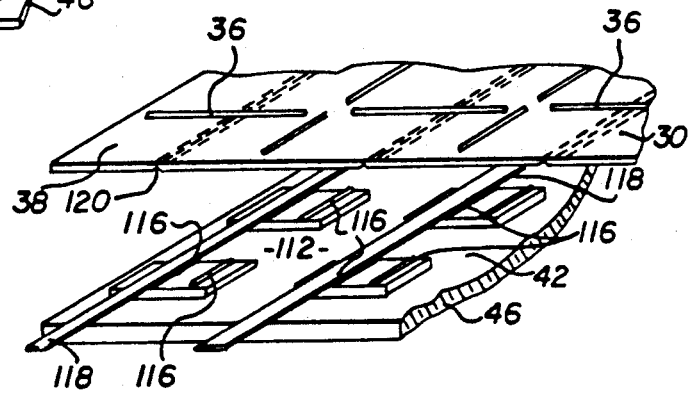
FIG. 19 is an exploded view, with elements broken away, showing completion of the first sequence of fabrication steps and a second sequence of fabrication steps for the fifth embodiment of the present invention.
Figure 20:
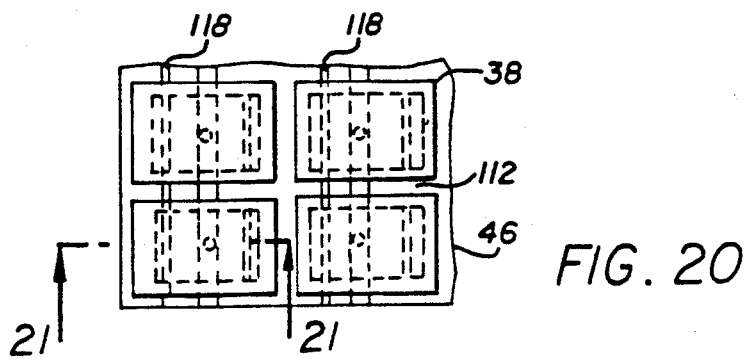
FIG. 20 is a phantom, broken away plan view of a fully assembled two dimensional mirror array constructed in accordance with the first and second sequence of fabrication steps for the firth embodiment of the present invention.

A plurality of second parallel grooves, are orthogonal to the first grooves, are also completely cut through the piezoelectric layer 50. Each of the second grooves is cut in a respective one of second interstices 114 between columns of the holes 40. Similarly, the second grooves remove piezoelectric material therefrom, as well as any metal on any face thereof. The cutting of the first and second grooves pattern the piezoelectric layer 50 into a plurality of piezoelectric pedestals 62, as best seen in FIG. 19. Each of the pedestals 62 includes the first face 52 of the piezoelectric layer 50 which is electrically connected to the metal 48 to the respective one of the holes 40, with the second face 54 being opposite thereto.

The foil 30, in a relatively rigid form, is mounted on a piezoelectric layer 50 subsequent to cutting of the first and second grooves. The rows 32 and columns 34 of the perforation 36 are generally disposed along the center line of the respective one of the first grooves in the first interstices 112 and the second grooves in the second interstices 114, respectively. The foil 30 is then cut along the perforations 36 to form a plurality of the mirrors 38 wherein each of the mirrors 38 is mounted to a respective one of the pedestals 62.

More particularly, the foil 30 is mounted to the pedestals adjacent the columns of perforations. Accordingly, a plurality of strips 116 of epoxy are applied along the second face 54 of each of the pedestals 62 adjacent the second grooves as best seen in FIG. 19.

Completing the steps in practicing the fifth embodiment of the present invention, the second face 54 of each of the piezoelectric pedestals 62 is electrically connected to a common circuit node (not shown) as described in the above referenced applications. In one embodiment of the present invention, this connection is made prior to mounting of the foil 30 by placing a plurality of electrically conductive strips 118 across the second face 54 of the pedestals. Each of the strips 118 is disposed across a respective one of the columns of the pedestals 62. One of the strips 116 of epoxy used to mount the foil 30 may also mount the conductive strip 118 to the pedestals 62. Each of the conductive strips 118 is then connected to the common circuit node. Alternatively, conductive strips 118 may be positioned as hereinabove described subsequent to mounting and cutting of the foil 30. If so, the strips 118 are bonded to the surface of the mirrors 38 by conductive epoxy. The foil 30 would also have to be electrically conductive as well as the strips 116 of epoxy.

In one particular embodiment of the present invention, the first grooves over the first interstices 112 and the second grooves over the second interstices 114 are relatively narrow and are substantially the same width, with the mirror 38 being generally coextensive with the second face 54 of each of the pedestals 62. In this particular two dimensional mirror array, an AC electrical signal is applied to each pedestal 62 through the metal 48 in each hole 40 with connection thereto being at the bottom surface 44 of the substrate 46. The ground connection is made through the strips 118 connected to the common circuit node. The AC signal causes deformation of the pedestal 62 laterally with respect to the top surface 42 of the substrate 46, with this deformation causing the pedestals 62 to decrease in width. The relatively rigid mirror 38 then arcuates in a vibratory manner in response to the AC signal to cause fan out of the reflected beam. The frequency of the arcuation and its amplitude is determined by the frequency and amplitude of the AC signal. To facilitate bending of the mirror 38, the foil may further have a plurality of elongated channels 120 and an underside thereof. Each of the channels 120 is alternatingly disposed between columns of the perforations 36. To enable the piezoelectric pedestal 62 to decrease in width, it is preferably mounted by the parallel strips of conductive epoxy 110 located along its center line.

With particular reference to FIGS. 22-25, a fabrication method for a sixth embodiment of a two dimensional mirror array is described. Similarly to the above described embodiments, an array of holes 40 is formed between the top surface 42 and the bottom surface 44 of the electrically insulated substrate 46. The holes 40 are disposed in equally spaced rows and in equally spaced columns. Furthermore, each of the columns 122 of the holes 40 contains a pair 124 of closely spaced holes in each row. Each of the holes 40 is filled with the electrically conductive material 48 as best seen in FIG. 25. The forming of the holes 40 and the filling thereof with the electrically conductive material 48 is practiced as hereinabove described.

The piezoelectric layer 50 is subsequently mounted on the substrate 46. The piezoelectric layer 50 is generally coextensive with the top surface 42 of the substrate 46. The piezoelectric layer 50 is mounted thereto along first parallel narrow strips 126 on the top surface. The strips 126 are parallel to the columns 122 of the holes 40. Each of the strips 126 is disposed adjacent both sides of each pair 124 of the holes 40 and separated therefrom by a distance generally ½ of the distance between each pair 124 of holes in each row. Each of the strips 126 may be a glue which does not have any electrical properties. A plurality of first parallel grooves are cut completely through the piezoelectric layer 50. Each of the first grooves are in a respective one of first interstices 128 between rows of the holes 40. The cutting of the first grooves completely removes piezoelectric material as well as any of the strips 126 of glue used to mount the piezoelectric layer 50 to the substrate 46.

A plurality of second parallel grooves are orthogonal to the first grooves are also completely cut through the piezoelectric layer 50. First alternate ones of the second grooves are cut over a respective one of the columns 122 of the holes 40. Second alternate ones of the second grooves are alternatingly disposed substantially midway between the first alternate ones of the second grooves over second interstices 130 between the columns 122 of the holes 140. Similarly, the second grooves remove any of the piezoelectric material therefrom. The cutting of the first and second grooves pattern the piezoelectric layer 50 into plurality of piezoelectric pedestals 62 as best seen in FIG. 23. Each of the pedestals 62 includes a first face 132 adjacent to respective to one of the holes 40 and a second face 134 on the opposite side of pedestals 62.

As best seen in FIGS. 24-25, the first face 132 of each of the pedestals 62 is electrically connected to the metal 48 in the adjacent one of the holes 40. The second face 134 of each of the pedestals 62 is connected to a common circuit node (not shown) as described in the above referenced applications. To electrically connect the first face 132 of each of the pedestals 62 to the metal 48 in the adjacent one of the holes 40, the second grooves above the columns 122 of the holes 40 are metallized with a metal 136 which coats the first face 132 of each of the pedestals 62 and the top surface 42 of the substrate 46 as closed by the first alternate ones of the second grooves. The metal 136 is then patterned to connect only the first face 132 of each of the pedestals 62 to the metal 48 in the adjacent one of the holes 40 as best seen in FIGS. 24-25. Similarly, to connect the second face 134 to the common circuit node, the second alternate ones of the second grooves in the second interstices 130 are metallized with a metal 138 which coats the second face 134 of each of the pedestals 62 and the top surface 42 of the substrate 46 exposed by the second alternate ones of the second grooves. The metal 138 is then electrically connected to the common circuit node. The metallization and patterning is performed through conventional microcircuit fabrication technique such as vapor deposition and photolithographic masking and etching.

The foil 30, in a relatively rigid form, is mounted to the piezoelectric layer 50 subsequent to cutting of the first and second grooves and metallizing is above described. The rows 32 and columns 34 of the perforations 36 are generally disposed along the center line of the respective one of one of the grooves in the first interstices 128 and the second grooves above the columns 122 of holes 40 and second interstices 130. The foil 30 is then cut along the perforation 36 to form the plurality of mirrors. Each of the mirrors 38 is disposed on a respective one of the pedestals 62. Opposing end portions 140 of each of the mirrors 38 are mounted to the second face 54 of each of the pedestals 62 at their edges adjacent the second grooves. More particularly, strips 142 of glue are applied along the edges adjacent the second grooves of each of the pedestals 62 prior to placing the foil 30 thereon. The above described strips 126 of glue are disposed generally midway under each of the pedestals 62 and separated from the column 122 of holes 40 by a distance generally ½ of the distance between each pair 124 of holes 40 in each row.

In one particular embodiment of the presently described invention, the first and second grooves over the first interstices 128 and the columns 122 and second interstices 130 are relatively narrow and of substantially equal width. In this particular two dimensional mirror array, an AC electrical signals apply to the first face 132 of each pedestals 62 through the metal 136 connecting each first face 132 to an adjacent one of the holes 40. The ground connection is made through the metal 138 in the second alternate ones of the second grooves. The AC signal causes the pedestals 62 to deform laterally with respect to the top surface 42 of the substrate 46 by contracting. Increasing amplitudes of the AC signal cause increasing contraction and increasing frequency of the AC signal causes the frequency of contraction to increase. Accordingly, the mirror 38, being mounted only at its edges 140 will arcuate in a vibratory manner, with the frequency of the AC signal determine the frequency of the vibration. The amplitude of the AC signal will determine the degree of the arcuation. To facilitate the bending of the relatively rigid foil 30, the foil 30 may have its underside precut with channels 146 alternatingly disposed between the columns 34 of the perforations 36. The AC voltage need only have a positive (or negative) amplitude and may therefore be a saw tooth wave form or a full rectified sinusoid. The vibratory arcuation of the mirror 38 then causes fan out of the reflective beam.

With particular reference to FIGS. 26-29, a fabrication method for seventh embodiment of a two dimensional mirror array is described. The array of holes 40 is formed between the top surface 42 and the bottom surface 44 of an electrically insulated substrate 46. The holes 40 in the seventh embodiment of the present invention are formed in equally spaced rows and in equally spaced columns. As described hereinabove, each of the holes 40 is filled with the electrically conductive material 48 as best seen in FIG. 29. The forming of the holes 40 and the filling thereof with the electrically conductive material 48 is practices hereinabove described.

The piezoelectric layer 50 subsequently mounted on the substrate 46. The piezoelectric layer 50 is generally coextensive with the top surface 42 with of the substrate 46. In one particular embodiment of the present invention, the first face 52 and the second face 54 of the piezoelectric layer 50 may be metallized by know techniques prior to mounting to the substrate 46. To mount the piezoelectric layer 50 to the substrate 46, the electrically conductive epoxy 56 is applied between the top surface 42 of the substrate 46 and the first face 52 of the piezoelectric layer 50. The metal 48 in each of the holes 40 electrically contacts the first face 52 of the piezoelectric layer 50 after the above described mounting is performed.

A plurality of narrow first grooves are cut completely through the piezoelectric layer 50. Each of the first grooves are cut in a respective one of the first interstices 152 between rows of the holes 40. The cutting of the first grooves completely removes piezoelectric material therefrom as well as any of the epoxy 56 and metal, if provided, on neither of the first face 52 or second face 54 of the piezoelectric layer 50.

A plurality of wide second grooves, are orthogonal to the first grooves are also completely cut through the piezoelectric layer 50. Each of the second grooves is cut in a respective one of second interstices 154 between columns of the holes 40. Similarly, the second grooves remove any of the epoxy 56 of any metal of the first face 52 or second face 54 of the piezoelectric layer 50. The cutting of the first grooves and the second grooves pattern the piezoelectric layer 50 into a plurality of pedestals 62, as best seen in FIG. 27. Each of the pedestals 62 includes the first face 52 of the piezoelectric layer 50 which is electrically connected to the metal 48 and a respected one of the holes 40, with the second face 54 being opposite thereto.

The foil 30, in a relatively flexible form, is mounted on the piezoelectric layer 50 subsequent to cutting of the first and second grooves. The rows 32 of the perforations 36 are disposed over a respective one of the first grooves over the first interstices 152. The columns 34 of the perforations 36 are disposed over a respective one of the second grooves of the second interstices 154 and further with the perforations 36 lined along an edge of the second grooves as best seen in FIGS. 28-29. To mount the foil 30 to the piezoelectric layer 50, the layer of the electrical conductive epoxy 64 may be applied to the second face 54 of each of the pedestals 62. The foil is then cut along the perforations 36 to form a plurality of mirrors 38 where in each of the mirrors is mounted to a respective one of the pedestals 62.

Completing the description of steps in the presently described embodiment of the present invention, the second face 54 of each of the piezoelectric pedestals 62 is electrically connected to a common circuit node (not shown) as described in the above referenced applications. In one embodiment of the present invention, this connection is made prior to mounting of the foil 30 by placing a plurality of electrically conductive strips 66 across the second face 54 of the pedestals 62 wherein each of the strips 66 is disposed in a respective one of pedestals 62. The conductive epoxy 64 used to mount the foil 30 will also mount the conductive strip 66 to the pedestal 62. Each of the conductive strips is then connected to the common circuit node. Alternatively, the conductive strip 66 may be positioned as hereinabove described subsequent to mounting and cutting of the foil 30. If so, the strips 66 are bonded to the surface of the mirrors 38 by conductive epoxy at a location overlying columns of the pedestals 62. The foil 30 would also be electrically conductive.

In this embodiment of the present invention, each of the mirrors 38 has a first portion 156 mounted to respective one of the pedestals 62 and a second portion 158 cantilevered from the respective one of the pedestals 62. In this particular two dimensional mirror array, an AC electrical signal is applied to each pedestal 62 through the metal 48 in each hole 40 with a connection thereto being at the bottom surface 44 of the substrate 46. The ground connection is made through the strip 66 connected to the common circuit node. The AC signal causes deformation of the pedestals 62 normal to the top surface 42 of the substrate 46. The cantilevered second portion 158 of the relatively flexible mirror 38 is then vibrated by the AC signal excited deformation to cause fan out of the reflective beam. The frequency of the vibration and its amplitude, determining the degree of fan out, is determined by the frequency and amplitude of the AC signal.

There has been described hereinabove a novel method for constructing two dimensional mirror arrays for an optical projection system. Those skilled in the art may now make new refuses of and departures from the above described embodiments without departing from the inventive concepts disclosed herein. Accordingly, the present invention is to be defined solely by the scope of the following claims.

We claim:

1. A method for fabricating an array of mirrors for an optical projection system, said method comprising the steps of:
    forming an array of holes between a top surface and a bottom surface in an electrically insulative substrate;
    filling said holes with an electrically conductive material;
    mounting a plurality of piezoelectric pedestals on said top surface of said substrate wherein each of said pedestals is disposed over a respective one of said holes so that a first face of each of said pedestals is electrically connected to said conductive material in said respective one of said holes;
    mounting a plurality of mirrors on said pedestals wherein each of said mirrors is disposed on at least one of said pedestals; and
    electrically connecting a second face of each of said pedestals to a common circuit node.

2. A method as set forth in claim 1, wherein said forming step includes the steps of:
    masking said substrate to form a first mask on said top surface wherein said mask has a plurality of first openings therethrough, each of said openings corresponding to a respective one of said holes;
    etching said substrate in areas exposed by said openings to form said holes; and
    removing said mask.

3. A method as set forth in claim 2, wherein said masking step further includes the step of forming a second mask on said bottom surface wherein said second mask has a plurality of second openings, each of said openings being aligned with a respective one of said first openings, said etching step further including the step of etching said substrate in the areas exposed by said second openings.

4. A method as set forth in claim 1, wherein said forming step includes the step of drilling said holes.

5. A method as set forth in claim 1, wherein said filling step includes the steps of:
    placing a metal on one of said top surface and said bottom surface of said substrate;
    melting said metal so that said metal flows into said holes; and
    removing said metal from said one of said top surface and said bottom surface.

6. A method as set forth in claim 1, wherein said mounting step of said pedestals includes the steps of:
    mounting a piezoelectric layer on said substrate, said piezoelectric layer being coextensive with said top surface;
    cutting a plurality of first parallel grooves through said piezoelectric layer, each of said first grooves being in a respective one of first interstices between parallel rows of said holes; and cutting a plurality of second parallel grooves through said piezoelectric layer, said second grooves being orthogonal to said first grooves, each of said second grooves being in a respective one of second interstices between parallel columns of said holes.

7. A method as set forth in claim 6, wherein said mounting step of said piezoelectric layer includes the step of applying an electrically conductive epoxy between said top surface and said piezoelectric layer, said cutting step of said first grooves and said second grooves removing said epoxy from said interstices.

8. A method as set forth in claim 1, wherein said mounting step of said mirrors includes the steps of:
   laying a reflective foil across said piezoelectric pedestal; and
   cutting said foil in the interstices between said pedestals to form each of said mirrors.

9. A method as set forth in claim 8, wherein said laying step includes the step of precutting said foil in selected areas thereof prior to laying said foil.

10. A method as set forth in claim 1, wherein said connecting step includes the steps of:
    routing a plurality of electrically conductive strips along said second face of said pedestals in parallel rows, one of said strips being used for each respective one of said rows, said strips being in electrical conduction with said second face of said pedestals; and
    interconnecting each of said strips to said note.

11. A method for fabricating an array of mirrors for an optical projection system, said method comprising the steps of:
    forming an array of holes between a top surface and bottom surface in an electrically insulative substrate;
    filling said holes with an electrically conductive material;
    mounting a plurality of piezoelectric pedestals on said top surface of said substrate wherein each of said pedestals has a first face disposed proximate to a respective one of said holes and a second face, said second face of each pedestals facing said second face of another of said pedestals;
    mounting a plurality of mirrors on said pedestals wherein each of said mirrors is disposed on at least one of said pedestals;
    electrically connecting said first face of each of said pedestals to said material in said respective one of said holes; and
    electrically connecting said second face of each of said pedestals to a common circuit node.

12. A method as set forth in claim 11, wherein said forming step includes the steps of:
    masking said substrate to form a first mask on said top surface wherein said mask has a plurality of first openings therethrough, each of said openings corresponding to a respective one of said holes;
    etching said substrate in areas exposed by said openings to form said holes; and
    removing said mask.

13. A method as set forth in claim 12, wherein said masking step further includes the step of forming a second mask on said bottom surface wherein said second mask has a plurality of second openings, each of said openings being aligned with a respective one of said first openings, said etching step further including the step of etching said substrate in the areas exposed by said second openings.

14. A method as set forth in claim 11, wherein said forming step includes the step of drilling said holes.

15. A method as set forth in claim 11, wherein said filling step includes the steps of:
    placing a metal on one of said top surface and said bottom surface of said substrate;
    melting said metal so that said metal flows into said holes; and
    removing said metal from said one of said top surface and said bottom surface.

16. A method as set forth in claim 11, wherein said mounting step of said pedestals includes the steps of:
    mounting a piezoelectric layer on said substrate, said piezoelectric layer being coextensive with said top surface;
    cutting a plurality of first parallel grooves through said piezoelectric layer, each of said first grooves being in a respective one of first interstices between parallel rows of said holes; and
    cutting a plurality of second parallel grooves through said piezoelectric layer, said second grooves being orthogonal to said first grooves, each of first alternate ones of said second grooves overlying a respective one of parallel columns of said holes and each of second grooves being alternating disposed generally midway between said first alternate ones.

17. A method as set forth in claims 11, wherein said mounting step of said mirrors includes the steps of:
    mounting an optically reflective foil across said piezoelectric pedestals; and
    cutting said foil in selected ones of the interstices between said pedestals to form each of said mirrors.

18. A method as set forth in claim 17, wherein said laying step includes the step of precutting said foil in selected areas thereof prior to laying said foil.

19. A method as set forth in claim 11, wherein said electrically connecting step of said first face includes the steps of:
    metallizing said first face of said pedestals and second top surface along parallel columns; and
    patterning to extend only between each first said selected one of said holes.

20. A method as set forth in claim 11, wherein said electrically connecting step of said second face includes the steps of:
    metallizing said second face of said pedestals and said top surface along parallel columns;
    interconnecting metal in each of said columns to said node.

21. A method for fabricating an array of mirrors for an optical projection system, said method comprising the steps of:
    forming an array of holes between a top surface and a bottom surface of an electrically insulative substrate;
    filling said holes with an electrically conductive material;
    mounting a piezoelectric layer on said substrate, said layer being generally coextensive with said top surface, said material electrically contacting said layer;
    cutting a plurality of first parallel grooves completely through said piezoelectric layer, each of said first grooves being in a respective one of first interstices between rows of said holes;
    cutting a plurality of second parallel grooves completely through said piezoelectric layer, each of said second grooves being in a respective one of second interstices between columns of said holes, said cutting of said first grooves and said second grooves patterning said piezoelectric layer into a plurality of pedestals wherein each of said pedestals has a first face electrically connected to said conductive material in a respective one of said holes and a second face opposite said first face;

placing a relatively flexible optically reflective foil on said piezoelectric layer, said foil having rows and columns of precut perforations, each of said rows of said precut perforations being generally disposed along a center line of a respective one of said first grooves, each of said columns of said precut perforations being generally disposed along a center line of a respective one of said second grooves;

cutting said foil along said perforations to form a plurality of mirrors, each of said mirrors being disposed on a respective one of said pedestals wherein each of opposite ends of said mirrors overly one of said second grooves and a middle portion of said mirror is mounted to said respective one of said pedestals; and electrically connecting said second face of each of said pedestals to a common circuit node.

22. A method as set forth in claim 21, wherein said holes are disposed in equally spaced columns and in equally spaced rows.

23. A method as set forth in claim 21, wherein said first grooves are relatively narrow and said second grooves are relatively wide.

24. A method as set forth in claim 21, wherein said mounting step of said layer includes the step of applying an electrically conductive epoxy between said top surface and said layer, cutting step of said first and second grooves removing said epoxy from said first and second interstices.

25. A method as set forth in claim 24, further comprising the steps of:

metallizing a first face of said layer prior to said mounting to said substrate, said cutting of said first and said second grooves further removing metal therefrom so that metal remains only on said first face of said pedestal.

26. A method as set forth in claim 21, wherein said mounting of said foil includes applying an electrically conductive epoxy between said second face of said pedestals and said foil.

27. A method as set forth in claim 26, wherein said electrically connecting step includes the step of placing a plurality of electrically conductive strips across said second face of said pedestals, each of said strips being disposed across a respective one of columns of said pedestals and being affixed thereto by said epoxy.

28. A method as set forth in claim 27, further comprising the step of:

metallizing a second face of said layer prior to said mounting step of said substrate, said cutting step of said first and second grooves further removing metal therefrom so that metal remains only on said second face of said pedestals.

29. A method for fabricating an array of mirrors for an optical projection system, said method comprising the steps of:

forming an array of holes between a top surface and a bottom surface of an electrically insulative substrate wherein said holes are formed in spaced apart pairs along each row of said holes, said spaced apart paris being aligned in columns;

filling said holes with an electrically conductive material;

mounting a piezoelectric layer on said substrate, said layer being generally coextensive with said top surface, said material electrically contacting said layer;

cutting a plurality of first parallel grooves completely through said layer, each of said first grooves being in a respective one of first interstices between columns of said holes wherein said first interstices are within said pairs of holes;

cutting a plurality of second parallel grooves orthogonal to said first grooves completely through said layer, each of said second grooves being in a respective one of second interstices between rows of said holes;

cutting a plurality of third parallel grooves parallel to said first grooves completely through said layer, third grooves being in a respective one of third interstices between columns of said holes wherein said third interstices are between said pairs of holes, said first, second and third grooves patterning said layer into a plurality of spaced apart pairs of piezoelectric pedestals, each of said spaced apart pairs of pedestals being associated with a respective one of said spaced apart pairs of holes, each of said pedestals being disposed over a respective one of said holes and having a first face in electrical contact with said material in said respective one of said holes, and a second face opposite said first face;

mounting a relatively rigid optically reflective foil on said piezoelectric layer, said foil having rows and columns of precut perforations, each of said rows of perforations being positioned over a respective one of said second grooves and each of said columns of perforations being positioned over a respective one of said third grooves;

cutting said foil along said perforations to form a plurality of mirrors, each of said mirrors being disposed on a respective one of said spaced apart pairs of piezoelectric pedestals with each opposing end portion of said mirrors being disposed on said second face of a respective one of said pedestals in each of said pairs of pedestals and further with a middle portion disposed over a respective one of said first grooves; and electrically connecting said second face of said pedestals to a common circuit node.

30. A method as set forth in claim 29, wherein said rows of holes are equally spaced from each other and said columns of spaced apart pairs of holes are equally spaced from each other.

31. A method as set forth in claim 29, wherein said first grooves are relatively wide and said second and said third grooves are relatively narrow.

32. A method as set forth in claim 29, wherein said mounting step of said layer includes the step of applying an electrically conductive epoxy between said top surface and said layer, each cutting of said first, said second and said third grooves removing said epoxy from said first, said second and said third interstices.

33. A method as set forth in claim 32, further comprising the step of:

metallizing a first face of said layer prior to said mounting to said substrate, said cutting of said first, said second and said third grooves further removing metal therefrom so that metal remains on said first face of said pedestals.

34. A method as set forth in claim 29, wherein said mounting step of said foil includes the step of applying an electrically conductive epoxy between said second face of said pedestals and said foil.

35. A method is set forth in claim 34, wherein said electrically connecting step includes the step of placing a plurality of electrically conductive strips across said second face of selected ones of said pedestals, said selected ones being disposed in selected columns of said pedestals with one of said pedestals from each of said spaced apart pairs of said pedestals being in said selected columns, said strips being further affixed thereto by said epoxy, said foil further being electrically conductive to connect electrically said second face of each of said pedestals in each of said pairs to each other.

36. A method as set forth in claim 35, further comprising the step of:
 metallizing a second face of said layer prior to said mounting step of said substrate, said cutting step of said first, said second and said third grooves further removing metal therefrom so that metal remains only on said second face of said pedestals.

37. A method for fabricating an array of mirrors for an optical projection system, said method comprising the steps of:
 forming an array of holes between a top surface and a bottom surface of a substrate;
 filling each of said holes with an electrically conductive material;
 mounting a piezoelectric layer on said substrate, said layer being generally coextensive with said top surface, said conductive material in each of said holes electrically contacting said layer, said layer being attached to said substrate at a plurality of locations wherein each of said locations is proximate a respective one of said holes;
 cutting a plurality of first parallel grooves completely through said layer, each of said first grooves being in a respective one of first interstices between said rows of holes;
 cutting a plurality of second parallel grooves orthogonal to said first grooves completely through said layer, each of said second grooves being in a respective one of second interstices between said columns of said holes, said cutting of said first grooves and said second grooves patterning said layer into a plurality of piezoelectric pedestals, each of said pedestals having a first face in electrical contact with said material in a respective one of said holes and a second face opposite said first face;
 mounting a relatively flexible optically reflective foil on said piezoelectric layer, said foil having precut rows and columns of perforations, said foil being mounted to said layer adjacent said columns of perforations;
 cutting said foil along said perforations to form a plurality of mirrors, each of said mirrors being disposed on a respective one of said pedestals and generally coextensive therewith wherein opposite edge portions of each mirrors are mounted to said respective one of said pedestals; and
 electrically connecting said second face of said pedestals to a common circuit node.

38. A method as set forth in claim 37, wherein said holes are disposed in equally spaced columns and in equally spaced rows.

39. A method as set forth in claim 37, wherein said first grooves and said second grooves are relatively narrow and are substantially of the same width.

40. A method as set forth in claim 37, wherein said mounting step of said layer includes the step of applying a plurality of strips of an electrically conductive epoxy between said top surface and said layer, each of said strips being disposed over a respective one of said columns of said holes, each cutting step of said first and said second grooves removing said epoxy from said first and said second interstices.

41. A method as set forth in claim 40, further comprising the step of:
 metallizing a first face of said layer prior to said mounting step of said substrate, said cutting step of said first and said second grooves further removing metal therefrom so that metal remains only on said first face of said pedestals.

42. A method as set forth in claim 37, wherein said mounting step of said foil includes the step of applying a plurality of strips of epoxy along said second face of each of said pedestals adjacent said second grooves.

43. A method as set forth in claim 37, wherein said electrically connecting step includes the steps of placing a plurality of electrically conductive strips across said second face of said pedestals, each of said strips being disposed across a respective one of columns of said pedestals; and
 affixing said strips to said second face of said pedestals by an electrical conductive epoxy.

44. A method as set forth in claim 43, further comprising the step of:
 metallizing a second face of said layer prior to said mounting step of said substrate, said cutting step of said first and second grooves further removing metal therefrom so that metal remains only on said second face of said pedestals.

45. A method as set forth in claim 37, wherein said foil further has a plurality of elongated channels on an underside thereof, each of said channels being alternating disposed between said columns of perforations to facilitate bending of said mirror.

46. A method for fabricating a mirror array for an optical projection system, said method comprising the steps of:
 forming an array of holes between a top surface and a bottom surface of a substrate wherein said holes are in equally spaced rows and equally spaced columns and further wherein each of said columns of said holes contains a pair of closely spaced holes at each row;
 mounting a piezoelectric layer on said substrate, said layer being generally coextensive with said top surface, said layer being mounted along first parallel narrow strips on said top surface wherein said strips are parallel to said columns, each of said strips being disposed adjacent both sides of each pair of said holes and separated therefrom by a distance generally one-fourth of the distance between each pair of holes in each row;
 cutting a plurality of first parallel grooves completely through said piezoelectric layer, each of said first grooves being in a respective one of first interstices between said rows of said holes;
 cutting a plurality of second parallel grooves orthogonal to said first grooves completely through said piezoelectric layer, first alternate ones of said second grooves being over a respective one of said columns of said holes, second alternate ones of said second grooves being alternating disposed substantially midway between said first alternate ones, said cutting of said first and said second grooves patterning said piezoelectric layer into a plurality of pedestals bonded substantially along a center line thereof to said substrate by said narrow strips, said pedestals each having first and second faces;

mounting a relatively flexible optically reflecting foil on said second face, said foil having rows and columns of precut perforations, said foil being mounted to said layer adjacent said columns of perforations;

cutting said foil along said perforations to form a plurality of mirrors, each of said mirrors being disposed on a respective one of said pedestals wherein opposite edge portions are bonded thereto, first alternate ones of said second grooves exposing said conductive material in said columns of said holes, second alternate ones of said grooves each being substantially midway between said columns of said holes;

electrically connecting said first face of each of said pedestals to said electrically conductive material in an adjacent one of said holes; and electrically connecting said metal in said second alternate ones to a common circuit node.

47. A method as set forth in claim 46, wherein said first grooves and said second grooves are relatively narrow and of substantially equal width.

48. A method as set forth in claim 46, wherein mounting step of said layer includes the step of applying a glue between said top surface and said layer along each of said strips, said cutting step of said first grooves removing said glue therefrom.

49. A method as set forth in claim 46, wherein mounting step of said foil includes the steps of:
applying strips of glue along edges of each of said pedestals wherein said edges are adjacent said second grooves; and
placing said foil on said pedestals.

50. A method as set forth in claim 46, wherein said foil further includes a plurality of channels on an underside thereof, each of said channels being alternating disposed between said columns of perforations.

51. A method as set forth in claim 46, wherein said step of electrically connecting said first face includes the steps of:
metallizing first alternative ones of said second grooves wherein said first alternative ones expose said holes; and
patterning metal in said first alternate ones to connect said first face of each of said pedestals to said electrically conductive material in an adjacent one of said holes.

52. A method as set forth in claim 51, wherein said step of electrically connecting said metal includes the steps of:
metallizing second alternate ones of said second grooves, said second alternate ones being alternatingly disposed between said first alternate ones; and
electrically connecting metal in said second alternate ones to said common circuit node.

53. A method for fabricating a mirror array for an optical projection system, said method comprising the steps of:

forming an array of holes between a top surface and a bottom surface of an electrically insulative substrate wherein said holes are grouped in triplets along each row of said holes, said triplets being aligned in columns;

filling said holes with an electrically conductive material;

mounting a piezoelectric layer on said substrate, said layer being generally coextensive with said top surface, said material being in electrical contact with said layer;

cutting a plurality of first parallel grooves completely through said layer, each of said first grooves being in a respective one of said first interstices between columns of said holes wherein said first interstices are between columns of said triplets;

cutting a plurality of second parallel grooves parallel to said first grooves completely through said layer, each of said second grooves being in a respective one of second interstices between columns of said holes wherein said second interstices are within said triplets of holes;

cutting a plurality of third parallel grooves orthogonal to said first grooves completely through said layer, each of said third grooves being in a respective one of third interstices between rows of said holes, said cutting of said first, second and third grooves patterning said layer into a plurality of piezoelectric pedestals wherein each of said pedestals has a first face in electrical contact with said material in a respective one of said holes, and a second face opposite said first face;

mounting a relatively rigid optically reflective foil on said piezoelectric layer, said foil having rows and columns of precut perforations, each of said rows of perforations being positioned over a respective one of said third grooves and each of said columns of perforations being disposed over a respective one of said first grooves;

cutting said foil along said perforations to form a plurality of mirrors, each of said mirrors being disposed on a respective triplet of said pedestals, each triplet being associated with a respective one of said triplets of said holes; and electrically connecting said second face of each of said pedestals to a common circuit node.

54. A method as set forth in claim 53, wherein each row of said holes is equally spaced from each other and said holes in each of said triplets are separated by a first distance and said holes in adjacent triplets are separated by a second distance.

55. A method as set forth in claim 53, wherein said first and said third grooves are relatively narrow and said second grooves are relatively wide.

56. A method as set forth in claim 53, wherein said mounting step of said layer includes the step of applying an electrically conductive epoxy between said top surface and said layer, each cutting step of said first, second and said third grooves removing said epoxy from said interstices.

57. A method as set forth in claim 50, further comprising the step of:
metallizing a first face of said layer prior to said mounting step of said substrate, said cutting step of said first, said second and said third grooves further removing metal therefrom so that metal remains only on said first face of said pedestals.

58. A method as set forth in claim 53, wherein said mounting step of said foil includes the step of applying an electrically conductive epoxy between said second face of said pedestals and said foil.

59. A method as set forth in claim 58, wherein said step of electrically connecting includes the step of placing a plurality of electrically conductive strips across said second face of selected ones of said pedestals, said selected ones being disposed on selected columns of said pedestals with one of said pedestals from each of said triplets being in said selected columns, said strips being further affixed thereto by said epoxy, said foil further being electrically conductive to connect electrically said second face of each of said pedestals of each of said triplets to each other.

60. A method as set forth in claim 59, further comprising the step of:
metallizing a second face of said layer prior to said mounting to said substrate, said cutting of said first, said second and said third grooves further removing metal therefrom so that metal remains on said second face of said pedestals.

61. A method for fabricating an array of mirrors for an optical projection system, said method comprising the steps of:
forming an array of holes between a top surface and a bottom surface in an electrically insulative substrate;
filling said holes with an electrically conductive material;
mounting a piezoelectric layer on said substrate, said layer being generally coextensive with said top surface;
cutting a plurality of first parallel grooves completely through said layer, each of said first grooves being in a respective one of first interstices between rows of said holes;
cutting a plurality of second parallel grooves orthogonal to said first grooves completely through said layer, each of said second grooves being over a respective one column of said holes;
cutting a plurality of third parallel grooves orthogonal to said first grooves completely through said layer, said third grooves being alternatingly disposed substantially midway between said second grooves, said cutting of said first, second and third grooves patterning said layer into a plurality of pedestals wherein rows of said pedestals are arranged in spaced apart pairs, each of said holes being disposed intermediate said pedestals in a respective one of said spaced apart pairs;
mounting a relatively rigid, optically reflective foil to said layer, said foil having rows and columns of precut perforations, each of said rows of said perforations being disposed over a respective one of said first grooves and each of said columns of perforations being disposed over a respective one of said third grooves;
cutting said foil along said perforations to form a plurality of mirrors, each of said mirrors being disposed on a respective one of said spaced apart pairs with opposing end portions mounted to said second face of said pedestals in each of said pairs and a middle portion disposed over one of said second grooves;
electrically connecting a first face of each of said pedestals to said conductive material in an adjacent one of said holes; and
electrically connecting a second face opposite of said first face of each of said pedestals to a common circuit node.

62. A method as set forth in claim 61, wherein said holes are disposed in equally spaced rows and in equally spaced columns.

63. A method as set forth in claim 61, wherein said first and said third grooves are relatively narrow and said second grooves are relatively wide.

64. A method as set forth in claim 61, wherein said mounting step of said layer includes the step of applying a glue between said top surface and said layer, said cutting step of said first, said second and said third grooves removing said glue therefrom.

65. A method as set forth in claim 61, wherein said mounting step of said foil includes the steps of:
applying strips of glue along the edges of each of said pedestals; and
placing said foil on said pedestals.

66. A method as set forth in claim 65, wherein said foil further includes a plurality of channels on an underside thereof, each of said channels being alternatingly disposed between said columns of perforations.

67. A method as set forth in claim 61, wherein said step of electrically connecting said first face includes the steps of:
metallizing said second grooves so that metal coats a first face of each of said pedestals and said top surface exposed by said second grooves; and
patterning said metal in said second grooves to connect said first face of each of said pedestals to said conductive material in an adjacent one of said holes.

68. A method as set forth in claim 61, wherein said step of electrically connecting said second face includes the steps of:
metallizing said third grooves so that metal coats a second face opposite said first face of each of said pedestals and said top surface exposed by said third grooves; and
electrically connecting metal in said third grooves to said common circuit node.

69. A method for fabricating an array of mirrors for an optical projection system, said method comprising the steps of:
forming an array of holes between a top surface and a bottom surface of an electrically insulative substrate;
filling said holes with an electrically conductive material;
mounting a piezoelectric layer on said substrate, said layer being generally coextensive with said top surface, said material electrically contacting said layer;
cutting a plurality of narrow first grooves completely through said layer, each of said first grooves being in a respective one of first interstices between rows of said holes;
cutting a plurality of wide second grooves completely through said layer, each of said second grooves being in a respective one of second interstices between columns of said holes, said cutting of said first and second grooves patterning said layer into a plurality of pedestals, each of said pedestals having a first face electrically contacting said material and a respective one of said holes and a second face opposite said first face;

mounting a relatively flexible, optically reflective foil on said layer, said foil having rows and columns of precut perforations, each of said rows of perforations being over a respective one of said first grooves and each of said columns of said perforations being over a respective one of said second grooves, and further proximate an edge of said second grooves;

cutting said foil at said perforations to form a plurality of mirrors, each of said mirrors having a first portion disposed on a respective one of said pedestals and a second portion overlying one of said second grooves; and electrically connecting said second face of each of said pedestals to a common circuit node.

70. A method as set forth in claim 69, wherein said holes are in equally spaced rows and in equally spaced columns.

71. A method as set forth in claim 69, wherein said mounting step of said layer to said substrate includes the step of applying an electrically conductive epoxy between said top surface and said layer, said cutting step of said first and said second grooves removing said epoxy from said interstices.

72. A method as set forth in claim 71, further comprising the steps of:

metallizing a first face of said layer prior to said mounting step of said substrate, said cutting step of said first and said second grooves removing metal therefrom so that metal remains on said first face of said pedestals.

73. A method as set forth in claim 69, wherein mounting step of said foil includes the step of applying an electrically conductive epoxy between said second face of said pedestals and said foil.

74. A method as set forth in claim 73, wherein said step of electrically connecting includes the steps of:

placing a plurality of conductive strips across said second face of said pedestals, each of said strips being disposed across a respective one of columns of said pedestals and being affixed thereto by said epoxy; and electrically connecting each of said strips to said common circuit node.

75. A method as set forth in claim 74, further comprising the step of:

metallizing second face of said layer prior to said cutting of said first and said second grooves so that metal remains on said second face of said pedestals.

* * * * *